June 17, 1969
M. L. BROWN ET AL
3,450,422
HIGH-PRESSURE HYDRAULIC SWIVEL COUPLING
Filed Jan. 30, 1967
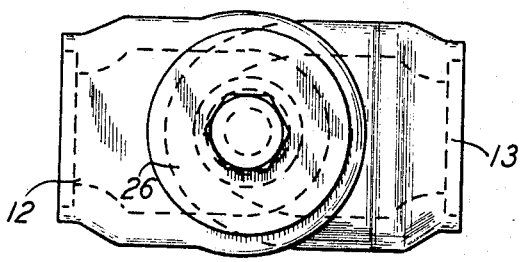
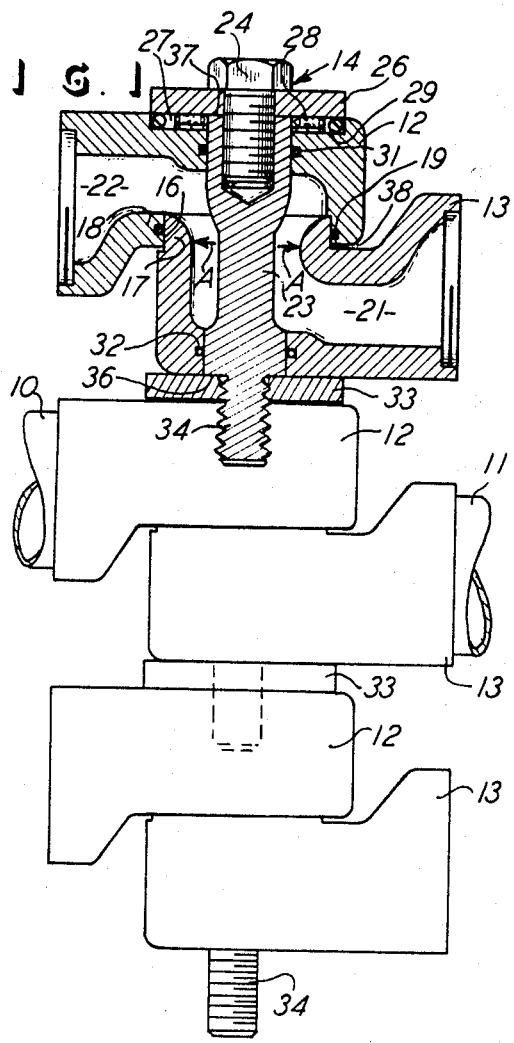
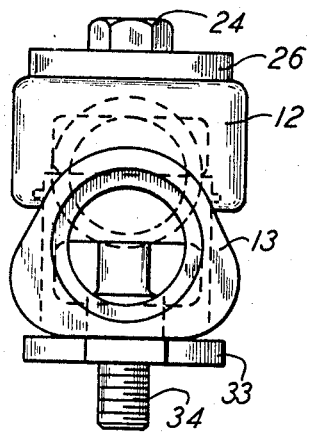
INVENTORS:
MARVIN L. BROWN
CARL O. PEDERSEN
ATTORNEY United States Patent Office 3,450,422
Patented June 17, 1969

3,450,422
HIGH-PRESSURE HYDRAULIC SWIVEL COUPLING
Marvin L. Brown and Carl O. Pedersen, Burlington, Iowa, assignors to J. I. Case Company, Racine, Wis., a corporation of Wisconsin
Filed Jan. 30, 1967, Ser. No. 612,638
Int. Cl. F16l 27/08, 27/00
U.S. Cl. 285—131                                    5 Claims

ABSTRACT OF THE DISCLOSURE

A high-pressure coupling having two halves which swivel relative to each other and which are connected by a bolt passing therethrough. An anti-friction bearing is interposed between the bolt and the coupling to assure freedom for swivelling, and the amount that the bolt can be tightened onto the bearing is limited. Fluid seals are disposed in the coupling and are of a type which does not require mechanical pressure, such as the force applied by the bolt, for the desired effectiveness of the seal. Further, the coupling is arranged with an extension on the bolt so that it can be received in an adjacent coupling and thereby permit desired stacking of a plurality of couplings for connecting a plurality of hydraulic lines.

Background of the invention

This invention relates to a high-pressure hydraulic swivel coupling.

The prior art contains disclosures of swivel couplings which are arranged in two halves connected by a bolt or the like. Also, bearings are known to have been interposed between the bolt and the coupling halves, and, of course fluid seals are also commonly used at points between the coupling halves and at points contiguous to the bolt. These high-pressure couplings tend to distort by actually expanding and thereby, when subjected to high pressure in the fluid in the coupling, these couplings lose their theoretical freedom for swivelling. That is, they actually freeze or bind under high pressure. For this reason, bearings have been known to be interposed between the assembly bolt and the coupling halves or parts.

However, the prior art couplings are generally arranged so that the fluid seal, for instance, requires a minimum of force axially of the bolt in order for the seal to be effective. Still further, the bolt and the bearing are related in an arrangement which permits the bolt to be tightened onto the bearing to a degree where the desired freedom in the coupling is lost, and swivelling is impeded. This causes the coupling to bind when it is subjected to high pressure in the fluid inside. An example of one form of the prior art is shown in U.S. Patent 1,920,610.

The present invention overcomes the aforementioned problems in that it provides a high-pressure hydraulic coupling for connecting parallel hydraulic lines and providing for swivelling of the coupling. The coupling does not bind under either the force of tightening the assembly bolt or the force applied by the fluid in the coupling. The amount that the bolt can be tightened mechanically is limited, and the interior fluid force is actually utilized for enhancing the effectiveness of the seals. Also, there are no seals requiring mechanical force for making the seals effective, and therefore the bolt need not be tight to where the coupling halves will not readily swivel, as desired. Finally, the coupling is arranged so that a plurality of couplings can be compactly stacked together and assembled together into one unit for the desired connection between hydraulic lines.

Brief description of the drawing

FIG. 1 is a longitudinal sectional view taken through a coupling of this invention, and showing additional couplings in diagrammatic showings disposed below the sectioned coupling.

FIG. 2 is a top plan view of a coupling.

FIG. 3 is a right-end elevational view of the coupling.

Description of the preferred embodiment

The coupling of this invention is used for high pressure application to join two lines, such as the lines 10 and 11. These are parallel lines, and the coupling is therefore arranged to accommodate them, and it is also arranged to permit the lines to swivel, one with respect to the other. Two coupling halves 12 and 13 are joined together by bolt means generally designated 14. FIG. 1 shows three complete couplings in stacked relation, and each individual coupling would have hydraulic lines connected thereto, such as the lines 10 and 11. It will further be understood that the coupling is arranged to swivel about the axis of the bolt 14, so that, for instance, the upper half 12 will pivot or swivel about the axis vertically through the bolt 14, while the lower half 13 may remain fixed and the two halves 12 and 13 are therefore movable relative to each other. Thus the halves 12 and 13 are telescoped together through the portion designated 16, and at this portion the two therefore overlap with the end 17 of the coupling 13 being received within the end portion 18 of the coupling 12. With this arrangement, it will therefore be understood that fluid under high pressure within the coupling will exert its force radially outwardly on the coupling portion 17, and this will actually enhance the effectiveness of the fluid seal 19 extending between the telescopic portions at the junction designated 16. The seal 19 is actually an O-ring type of seal and it is noted that this seal does not require any force axially of the bolt 14 for making the seal 19 fluid tight. Thus the bolt 14 need not be tight with the halves 12 and 13 to a point where it will impede the freedom between the halves for swivelling purposes. Instead, as mentioned, the arrangement is such that internal fluid pressure will actually enhance the sealing characteristics of the seal 19 since the exposed area of the portion 17 will render the seal 19 of even greater self-sealing characteristics than that normally present in this type of fluid seal.

Thus the coupling has a fluid passageway 21 in the half 13, and it has a fluid passageway 22 in the half 12, and these passageways are of course in flow-communication and can be placed in parallel position to accommodate the desired and virtually straightline flow between the hydraulic lines 10 and 11.

The bolt 14 consists of the shank portion 23 and the screw portion 24. A washer 26 is interposed between the head of the bolt 24 and the coupling half 12. Thus the washer 26 is coextensive with a recess 27 in the coupling half 12. An anti-friction bearing 28 and an O-ring 29 are disposed in the recess 27. Thus the bearing 28 is available for keeping the coupling movable with respect to the washer 26 and the bolt 24 and thus with respect to the other coupling half 13. Again, the dust seal 29 does not require mechanical force axially of the bolt 14 in order for the seal to be effective, and it is not therefore a packing type seal or the like. Another fluid seal 31 is disposed between the coupling half 12 and the bolt 14, and this also is an O-ring as shown. Likewise, a fluid seal 32 is disposed between the lower end of the bolt shank 23 and the coupling half 13, and this too is an O-ring as shown.

A threaded nut 33 is disposed on the threaded end 34 of the bolt shank 23, and the nut 33 is shouldered with the shank 23 by the shoulder 36. Also, the washer 26 abuts a shoulder 37 on the upper end of the shank 23. Thus, the screw 24 cannot be overtightened as the shoulders 36 and 37 prevents it from being tightened too tight with respect to the bearing 28 and the coupling halves 12 and 13.

Thus the mating surfaces between the bolt 14 and the coupling halves 12 and 13 are only axially of the bolt, and there is no mating surface transverse to the axis of the bolt which would permit the bolt to be overly tightened with respect to the coupling halves 12 and 13. Then the fluid seals are disposed on the axially extending mating surfaces and are effective for sealing without requiring the mechanical force axially of the bolt 14, as mentioned. Still further, the halves 12 and 13 are shown to have a space 38 therebetween, and therefore these halves cannot be tightened down onto each other to impede the relative movement therebetween. Also, the arrows designated A indicate the direction of outward force created by the fluid within the coupling, and this outward force causes the coupling to be self-sealing in that it moves the coupling portion 17 into snug contact with the coupling portion 18 in that telescopic connection designated 16.

The shank threaded end 34 is shown to extend below the nut 33, and it is shown in the diagrammatic showing in FIG. 1 below the sectioned portions that additional coupling members can therefore be assembled in stacked relation. Thus the shank threaded portion 34 would replace the screw 24 in the additional lower couplings. All of the couplings therefore can be compactly assembled together and all the halves are movable relative to each other within each coupling, and of course between the couplings also.

The entire arrangement is such that a large flow capacity can be provided for with a relatively small outside size of coupling with its passageways offset to only a minimum. This coupling has particular application in machinery using hydraulic cylinders which are fed by flexible hydraulic lines. This has particular application in earth-working machinery such as backhoes, shovel loaders, and like hydraulically powered equipment.

What is claimed is:

1. A high-pressure hydraulic swivel coupling for connecting between two hydraulic lines which are relatively laterally movable through swivelling of said coupling, said coupling comprising two halves each having a bore therethrough thereby providing fluid communication between said halves, one of said halves having an end received with said bore of the other of said halves, a bolt extending completely through said halves securing said halves together and providing the swivel axis of said coupling, securing means on said bolt for tightening said bolt relative to said halves, an anti-friction bearing disposed between said bolt and said halves, said halves being telescoped together on mating surfaces and spaced apart axially of said bolt for free swivel of said halves relative to each other at the telescopic connection, hydraulic seal O-rings disposed intermediate said mating surface and between each said half and said bolt and only in planes transverse to the axis of said bolt and arranged for fluid sealing only axially of said bolt, said bolt including shoulder portions shouldered axially of said bolt, said anti-friction bearing being disposed in contact with said securing means of said bolt and with one of said halves for anti-friction movement of at least said one of said halves relative to said bolt, and said shoulder portions on said bolt being disposed to limit the tightening of said securing means of said bolt with respect to said halves.

2. The subject matter of claim 1, wherein the interior surface of the one half telescoped wthin the other half presents a greater area faced toward said O-ring, which is intermediate said mating surfaces, than does said other said half so that said interior surface is subjected to fluid pressure for expanding said one half radially of said bolt and against said O-ring, which is intermediate said mating surfaces, for self-sealing in accordance with the pressure of the fluid in said coupling.

3. The subject matter of claim 1, wherein said bolt includes a shank extending between said coupling halves and said securing means includes a screw axially threaded into said shank at one end thereof, said bolt includes a washer disposed between said screw and said one end of said shank, said washer abutting one of the said shoulder portions of said bolt, and said bearing being disposed between said washer and said halves, said screw being shoulder-limited in threading into said shank for the limit of the amount said washer can be tightened onto said bearing.

4. The subject matter of claim 3, wherein said bolt projects beyond said halves in a threaded end and is threadedly receivable in said shank in place of said screw in another one of said couplings disposed adjacent the first one of said couplings, for a stacking arrangement of said couplings.

5. The subject matter of claim 1, wherein one end of said bolt projects beyond said halves in an exteriorly threaded end and the other end of said bolt has a threaded hole capable of threadedly receiving said exteriorly threaded end to have one of said couplings mate with another of said couplings disposed adjacent the first one of said couplings, for a stacking arrangement of said couplings.

References Cited

UNITED STATES PATENTS

| | | | |
|---|---|---|---|
| 586,841 | 7/1897 | Drew | 285—185 |
| 673,280 | 4/1901 | Moran | 285—181 X |
| 1,532,774 | 4/1925 | Page | 285—190 |
| 1,920,610 | 8/1933 | Timbs | 285—151 |
| 2,083,970 | 6/1937 | Walter | 285—190 X |
| 2,831,709 | 4/1958 | Shaw et al. | 285—185 |
| 3,322,886 | 5/1967 | Warshawsky | 285—272 X |

FOREIGN PATENTS 1,088,497   9/1954   France.

CARL W. TOMLIN, *Primary Examiner.*

DAVE W. AROLA, *Assistant Examiner.*

U.S. Cl. X.R.

285—181, 275